United States Patent [19]

Lakin

[11] Patent Number: 4,800,309
[45] Date of Patent: Jan. 24, 1989

[54] SELF-ALIGNING BEARING AND OIL CAP MOUNT FOR AN ELECTRIC MOTOR

[75] Inventor: Bryan L. Lakin, Springfield, Mo.

[73] Assignee: Fasco Industries, Inc., Lake Forest, Ill.

[21] Appl. No.: 69,116

[22] Filed: Jul. 2, 1987

Related U.S. Application Data

[62] Division of Ser. No. 806,028, Dec. 6, 1985, Pat. No. 4,711,590.

[51] Int. Cl.[4] ............................................. H02K 7/08
[52] U.S. Cl. ..................................... 310/90; 310/42; 310/89; 310/91
[58] Field of Search ..................... 310/90, 89, 91, 42, 310/40 MM; 384/489, 206–214

[56] References Cited

U.S. PATENT DOCUMENTS

| | | | |
|---|---|---|---|
| 2,483,013 | 9/1949 | Kopprasch | 310/90 UX |
| 2,739,020 | 3/1956 | Howes | 310/90 UX |
| 2,751,265 | 6/1956 | Wightman | 310/90 UX |
| 2,984,528 | 5/1961 | Shafer | 310/90 UX |
| 3,013,167 | 12/1961 | Bobula | 310/90 UX |
| 3,164,422 | 1/1965 | Shaffer | 310/90 UX |
| 3,483,409 | 12/1969 | Phillips | 310/90 UX |
| 3,573,510 | 4/1971 | Otto | 310/90 UX |
| 3,624,434 | 11/1971 | Dafler | 310/90 |
| 3,704,923 | 12/1972 | Rajna | 310/90 UX |
| 3,885,176 | 5/1975 | Cunningham | 310/90 |
| 4,357,552 | 11/1982 | MacMillan | 310/90 |
| 4,409,714 | 10/1983 | Cunningham | 310/90 |
| 4,456,845 | 6/1984 | Cunningham | 310/90 |
| 4,523,118 | 6/1985 | Cunningham | 310/90 |

FOREIGN PATENT DOCUMENTS

| | | | |
|---|---|---|---|
| 0284534 | 5/1975 | Australia | 310/90 |
| 2426688 | 4/1975 | Fed. Rep. of Germany | 310/90 |
| 0218504 | 2/1985 | German Democratic Rep. | 310/89 |

Primary Examiner—R. Skudy
Attorney, Agent, or Firm—Rogers, Howell, Moore & Haferkamp

[57] ABSTRACT

A self-aligning bearing and end shield mount for an electric motor or the like. The bearing mount has a spacer with a hub through which the rotor shaft extends and fingers that seat within an annular locating groove of the rotor shaft for securing the spacer to the shaft. The spacer also has a thrust surface. A spring has a hub portion through which the rotor shaft extends and a ring surrounding the hub with resilient arms therebetween. The spring also has a bearing seat and a thrust plate seat. A self-aligning bearing is seated in a bearing socket in the end shield of the motor housing and in the bearing seat of the spring. A thrust plate is seated within the thrust plate seat of the spring with the thrust surface of the spacer running against a surface portion of the thrust plate.

The oil cap mount inlcudes circumferentially spaced protrusions extending out of the surface of the end shield and formed integrally therewith to define an oil cap seat. The protrusions are deformed to engage and overlie side surfaces of the oil cap to secure the oil cap to the end shield.

11 Claims, 2 Drawing Sheets

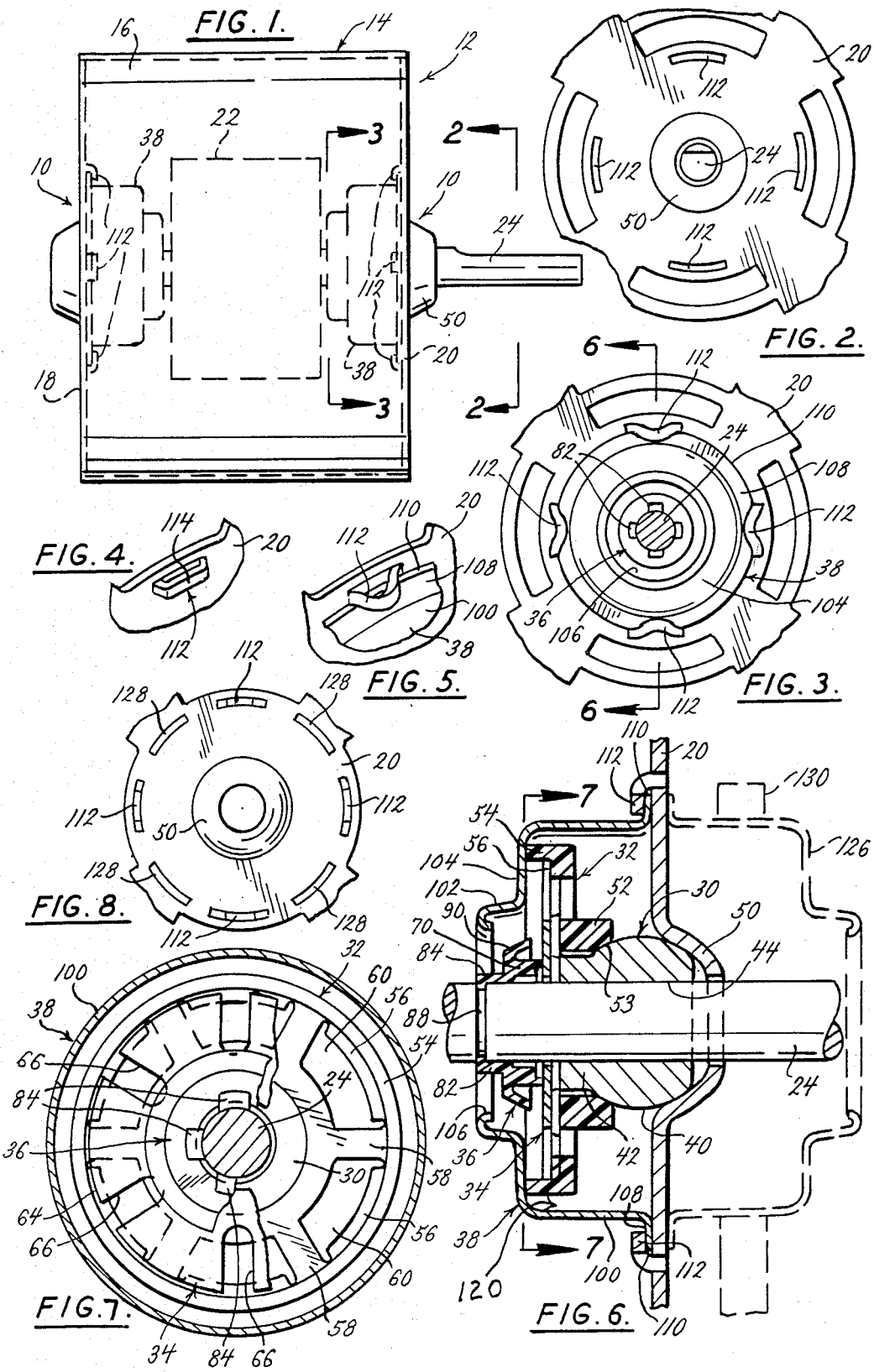

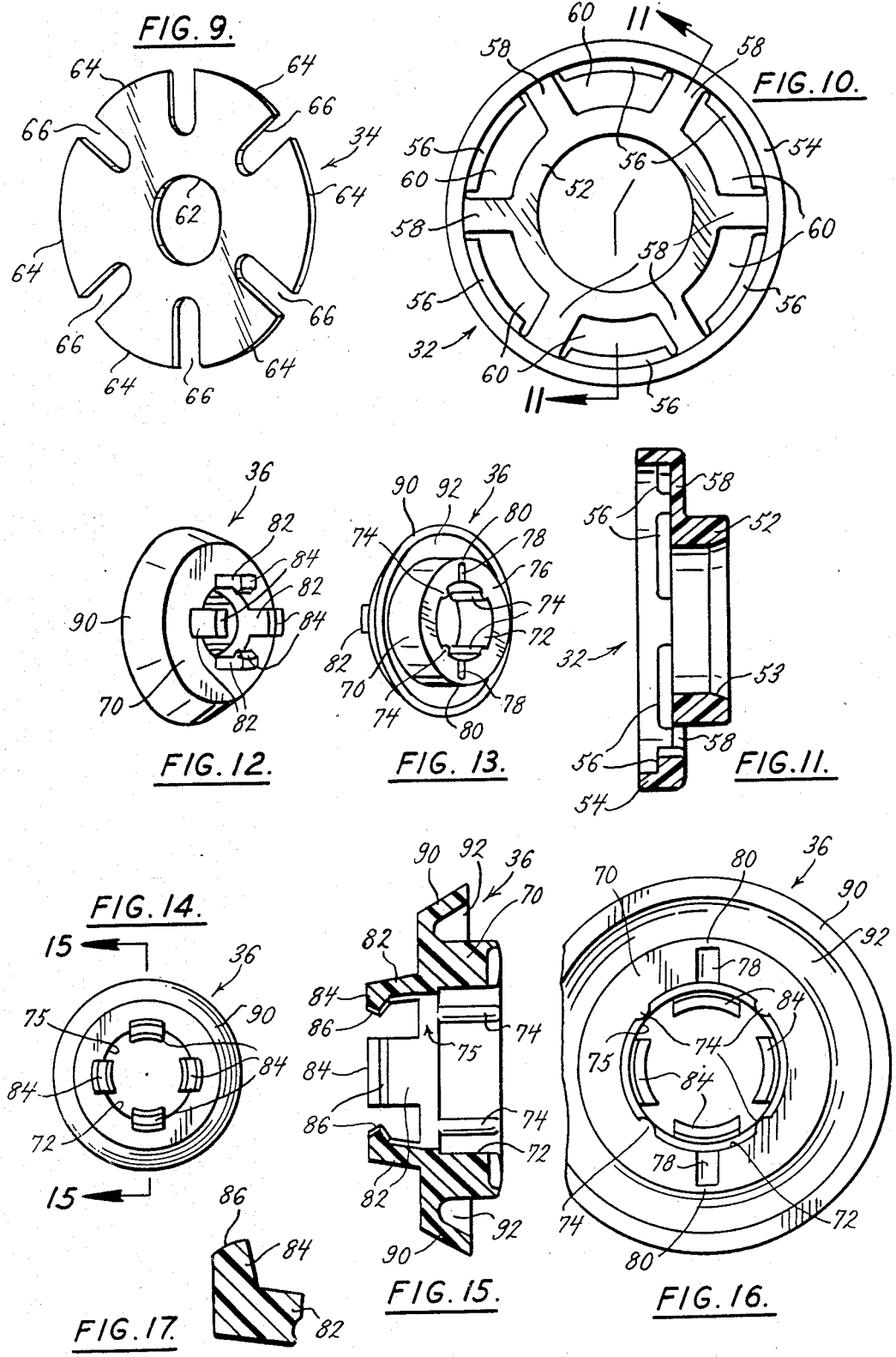

SELF-ALIGNING BEARING AND OIL CAP MOUNT FOR AN ELECTRIC MOTOR

This is a divisional of co-pending application Ser. No. 806,028, filed on Dec. 6, 1985, now U.S. Pat. No. 4,711,590.

BACKGROUND AND SUMMARY OF THE INVENTION

This invention generally relates to a self-aligning bearing and oil cap mount primarily for use in a fractional horsepower electric motor or the like, and more particularly to such a mount comprising a spacer, spring, and thrust plate, and oil cap where the structures of these components and the manner in which they function together in combination with a self-aligning bearing provide a reliable, long-life, low cost mount that lends itself to assembly with automated techniques. There are numerous self-aligning bearing structures known in the art to which this invention relates. Examples are disclosed in U.S. Pat. Nos.: 2,483,013; 2,739,020; 2,751,265; 2,984,528; 3,013,167; 3,164,422; 3,483,409; 3,573,510; 3,624,434; 3,885,176; 4,409,714; 4,456,845; and 4,523,118. The disclosures of these patents include spacers for locating the rotor shaft; spring means of various types for resiliently supporting the bearings; thrust plates to provide thrust bearing means and resilience; oil slingers for directing lubricating oil from the rotor shaft radially outwardly to an oil wick for circulation to the bearings; and oil catchers for catching lubricating oil and preventing it from flowing to the rotor. There are also various techniques known in the art for mounting oil caps to the end shields. These include welding and various types of fasteners.

The spacer, spring, thrust plate and oil cap mount of this invention, and the manner in which they function together, are unique and have numerous advantages. The spacer is of low cost, one piece, molded construction. It has fingers that grip within annular grooves in the rotor shaft and function to axially locate the rotor shaft with great accuracy. The fingers slide along the shaft for ease of assembly by placing the spacer over the end of the shaft and applying an axial force, yet firmly seat within the locating groove in the shaft to securely hold the spacer in place. It has a thrust surface that runs against a thrust plate to carry the thrust load. Radial grooves in the thrust surface are obstructed at their outer ends to trap oil which lubricates the thrust surface and thrust plate. An oil slinger ring directs lubricating oil from the rotor shaft back to the oil wick for recirculation to the self-aligning bearing. The spacer also has an annular trough that functions as an oil catcher for preventing oil from flowing to the rotor.

The spring of this invention is also of low cost, one piece, molded construction, and includes a central hub having a bearing seat at its outer end for receiving the self-aligning bearing therein. It has a ring portion surrounding the hub, the ring portion having an annular recess that receives the thrust plate and supports the thrust plate in axially spaced relation to the hub so that the thrust plate may flex axially under thrust load. Resilient means such as radial arms extend from the hub to the ring and flex under loading applied by the oil cap. Thus, the spring functions to locate and support the thrust plate and self-aligning bearing. It also functions in conjunction with the thrust plate and other components to resiliently support the bearings in the axial direction with the thrust plate flexing to resiliently absorbe thrust loads. There is sufficient clearance between the spring and oil cap to allow the bearing to self-align, but yet the oil cap supports the spring, and hence the bearing, during assembly so that the rotor shaft may be easily inserted through the spring and bearing and precisely align the bearing.

The oil cap mounting of this invention has no separate fasteners for securing the oil cap to the end shield, and provides exceptionally low cost assembly with automated techniques. In accordance with this invention, the oil cap is secured to the end shield by protrusions that extend from the surface of the end shield. The protrusions and end shield are of one piece construction with the protrusions formed by lancing. These protrusions define with the end shield surface a recess for receiving the oil cap. The protrusions are deformed radially inwardly against the side and edge of the oil cap to hold it in place. The oil cap may be assembled to the end shield by automated techniques without regard to its circumferential orientation relative to the end shield. The protrusions accurately locate the oil cap to assure its concentricity with the bearing socket in the end shield regardless of the sequence in which the protrusions are radially deformed during automated assembly. The oil cap surrounds the bearing, spring, thrust plate, and spacer, and functions as an enclosure for oil wick for lubricating the bearing surface. It also functions as a bearing retainer and spring retainer and as a support during assembly as previously noted. An outer oil cap may be mounted to the end shield in the same manner to function as a hub for a motor mount for mounting the motor or as a reservoir for additional lubricant.

BRIEF DESCRIPTION OF THE DRAWINGS

FIG. 1 is a side view of an electric motor or the like incorporating the features of the present invention;

FIG. 2 is a right end view of FIG. 1 taken generally along the line 2—2 of FIG. 1;

FIG. 3 is a view in section taken generally along the line 3—3 of FIG. 1;

FIG. 4 is a partial view showing one of the protrusions for securing an oil cap to the end shield in accordance with this invention;

FIG. 5 is a view similar to FIG. 4 but showing the protrusion deformed to hold the oil cap in place;

FIG. 6 is a view in section taken generally along the line 6—6 of FIG. 3;

FIG. 7 is a view in section taken generally along the line 7—7 of FIG. 6;

FIG. 8 is a partial view showing the central portion of the end shield with the protrusions for mounting both an inner and outer oil cap;

FIG. 9 is a perspective view of a thrust plate in accordance with the present invention;

FIG. 10 is an end view of a spring in accordance with the present invention;

FIG. 11 is a view in section taken generally along the line 11—11 of FIG. 10;

FIG. 12 is a perspective view of a spacer in accordance with the present invention;

FIG. 13 is a view of the spacer of Figure 12 taken from a different perspective;

FIG. 14 is the spacer as viewed from the right end of FIG. 12;

FIG. 15 is a view in section taken generally along the line 15—15 of FIG. 14;

FIG. 16 is the spacer as viewed from the right side of FIG. 15; and

FIG. 17 is an enlarged partial section showing the contour of the gripping fingers of the spacer.

DETAILED DESCRIPTION OF THE PREFERRED EMBODIMENT

With reference to the drawing there is shown a self-aligning bearing and end shield mount 10 of the present invention for use with a fractional horsepower electric motor 12 or the like. The motor includes a housing 14 having a cylindrical sleeve 16 of circular cross section, and end shields 18 and 20 enclosing the ends of the sleeve. A rotor generally shown at 22 having a rotor shaft 24 is supported between the end shields by means of the self-aligning bearing and end shield mounts 10.

Each self-aligning bearing and end shield mount 10 generally includes a self-aligning bearing 30, a spring 32, a thrust plate 34, a spacer 36, and an oil cap 38.

The bearing 30 has a spherical surface portion 40 and a cylindrical portion 42 with an axial hole 44 through which the rotor shaft extends. The bearing may be of a porous metal so that lubricating oil may penetrate the bearing and lubricate the rotor shaft. The outer end of the bearing having the spherical surface is seated within a socket 50 formed within the end shield. The socket 50 has a generally spherical inside surface that forms a bearing seat for the bearing.

The cylindrical end portion 42 of the bearing extends within a hub 52 of the spring 32 just past the end of the hub. The outer end of the hub has an outwardly tapered surface 53 that defines a bearing seat. The spherical surface portion of the bearing next to the cylindrical portion rests against the bearing seat. The spring has an outer ring 54 that concentrically surrounds the hub and has an annular shoulder 56 that defines a thrust plate seat. The annular shoulder 56 is axially spaced from the inner end of the hub 52 and the end of the bearing for purposes to be described. Between the hub 52 and ring 54 are resilient means in the form of arms 58. The arms 58 flex generally in the axial direction. Between the arms are openings 60.

The thrust plate 34 is generally disk shaped and flat with a central hole 62 of a somewhat larger diameter than the rotor shaft that extends therethrough. The thrust plate has peripheral edges 64, with U-shaped openings 66 extending radially inwardly therefrom. The thrust plate is of a hard, wear resistant material, such as spring steel, that allows the plate to flex under thrust load. The thrust plate fits within the ring 54 of the spring so as to rest against the shoulder 56. The thrust plate fits closely within the ring such that the ring supports and locates the thrust plate concentric with the rotor shaft and spaced axially from the inner end of the spring hub and bearing, allowing the thrust plate to flex in the axial direction under thrust load.

The spacer 36 includes a hub portion 70 having a central hole 72 therethrough through which the rotor shaft extends. The hole 72 is of slightly large diameter than the shaft, but has ribs 74 that extend axially and engage the outer surface of the shaft to help guide the spacer to the shaft. The hub portion also has an oil seal ring portion 75 at the base of the ribs to prevent oil migration toward the rotor. The outer end of the hub portion 70 has a thrust surface 76 that faces toward the thrust plate and bearing. The thrust surface 76 is generally flat except for grooves 78 that extend radially from the hole in the hub portion toward the outer edge of the thrust surface. These grooves do not extend all the way to the outer edge. Instead, they are spaced from the outer edge to define obstructions 80 to direct lubricating oil onto the thrust surface and thrust plate. The thrust surface runs against the thrust plate at a surface portion of the thrust plate radially inwardly from the thrust plate seat such that a thrust load applied through the spacer causes the thrust plate to flex generally in the axial direction.

The spacer also includes arms 82 that extend generally in the axial direction from the hub 70 and have fingers 84 at the ends thereof. The fingers 84 seat within an annular locating groove 86 in the rotor shaft to secure the spacer against axial movement relative to the shaft. As best shown in FIG. 17, the tips of the fingers 84 are contoured as shown at 86. This configuration allows for ease of assembly of the spacer onto the rotor shaft, but yet firmly holds the spacer onto the shaft so that it will not move relative to the shaft under the forces encountered during operation of the motor. Hence, to place the spacer on the shaft, the spacer is placed over the end of the shaft with the fingers first. The contoured surfaces 86, acting against the end of the shaft by application of an axial force, cause the arms 82 to flex outwardly so that the contoured surfaces move along the shaft surface. When the fingers reach the locating groove 86 in the shaft, the arms 82 release radially inwardly so that the fingers lock within the groove.

A generally cup shaped oil slinger ring portion 90 surrounds the hub 70 and defines with the hub an annular trough 92 that opens toward the thrust surface 76. Oil slinger ring 90 directs oil radially outwardly from the shaft to an oil wick material (not shown) for recirculation to the bearing. The trough functions as an oil catcher to prevent oil from flowing axially toward the rotor.

The oil cap 38 includes cylindrical portions 100 and 102 joined by a flange portion 104. At the end of the cylindrical portion 102 is an opening 106 through which the rotor shaft extends. At the other end of the oil cap is an outwardly extending flange 108 having a circular outer edge surface 110. The end cap is mounted to the end shield concentric to the bearing socket.

In accordance with this invention, the oil cap is mounted to the end shield with the bearing and spring retained thereby without separate fasteners. The end shield has protrusions 112 extending from the surface of the end shield and formed integrally therewith from the material of the end shield such as by lancing. Each protrusion has a bar portion 114 spaced from the surface of the end shield and joined thereto at each end. While four such protrusions are shown for mounting each end shield, it is to be understood that a fewer or greater number could be used, although it is preferable that at least three such protrusions be used and that they be spaced equally about the circumference of the oil cap. The inner edges of the protrusions define, with the surface of the end shield, an oil cap seat. The oil cap fits within the seat with its flange 108 against the end shield surface, and its circular edge 110 in close proximity to the inner edges of the protrusions. The clearance between the edge 110 of the oil cap, and the inner edges of the protrusions is such that before the protrusions are deformed, as will be explained, the oil cap may be easily inserted within the oil cap seat, but the protrusions closely confine the oil cap so as top position it concentrically with the bearing socket.

After the oil cap is in place, the protrusions are deformed radially inwardly as shown in FIGS. 3, 5 and 6 such that the inner edges of the protrusions engage and overlie the side edge 110 of the oil cap to secure the oil cap to the end shield against both axial and rotational movement relative thereto. It will be noted that the oil cap may be inserted within the oil cap seat in any circumferential orientation prior to deformation of the protrusions for ease of assembly with automated techniques. Also, because of the close confines of the oil cap within the protrusions prior to deformation, the protrusions hold the oil cap in concentric alignment with the bearing socket even if the protrusions are not deformed simultaneously during assembly.

The oil cap 38 surrounds the bearing, spring, thrust plate, and spacer and functions as an enclosure for oil wick for lubricating the bearing surfaces. It also functions as a support for the bearing and spring during assembly of the rotor shaft in the bearing mount. The flange 104 contacts the outer ring of the spring and applies a load causing the arms 58 to flex. This contact supports the bearing and spring by keeping the spring perpendicular to the axis of the shaft, and through the spring hub 52 also aligns the bearing during initial assembly. the periphery of the spring 32 is spaced from the oil cap 38 as shown at 120 so that the bearing, spring, thrust plate, and spacer may axially aligned themselves. During assembly the bearing is supported by the spring hub internal diameter in sufficient axial alignment, due to engagement of the spring and oil cap, that the shaft 24 may be easily inserted through the open end of the oil cap and into the bearing. Once into the bearing, the shaft will align the bearing, spring, thrust plate, and spacer in correct precision axial alignment.

An outer oil cap depicted generally at 126 may also be secured to the end shield in the same manner as the inner oil cap. If an outer oil cap is used, the protrusions 128 for securing it to the end shield extend from the surface of the end shield in the direction opposite to those securing the inner oil cap. Preferably, the protrusions for mounting the outer oil cap alternate with those for the inner cap. The outer cap may function as a mounting hub for a support bracket depicted generally as 130 for mounting the motor or as a reservoir for additional lubricant.

In operation of the self-aligning bearing and end shield mount of this invention, the spacer rotates with the rotor shaft, while the bearing, spring, and thrust plate remain rotationally stationary. The thrust surface of the spacer runs against an inner portion of the thrust plate. The annular groove 86 in the shaft may be very accurately located so that the spacer lightly contacts the thrust plate. Under light load, the thrust surface of the spacer running against a portion of the thrust plate spaced radially inwardly from the thrust plate seat causes the thrust plate to flex generally radially toward the spring hub. Under greater thrust load the force applied by the thrust surface of the spacer against the thrust plate will cause the thrust plate to flex to a greater extend until it bottoms out against the end of the bearing. In this way, the bearing 30 is resiliently held within its socket under a wide range of thrust load conditions.

The cavity within the end shield is filled with oil wick (not shown) which also extends through the openings 60 in the spring and 66 in the thrust plate. Lubricating oil from the rotor shaft 24 is slung radially by means of the thrust surface and grooves 78 of the spacer and directed by the obstructions 80 onto the thrust surface and thrust plate to lubricate those surfaces. Oil is also slung into the oil wick by slinger ring 90 for recirculation to the bearing. The oil penetrates the porous bearing to lubricate the shaft and from there is recycled. The trough 92 functions as an oil catcher to prevent oil from flowing axially to the rotor.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a dynamoelectric machine having a housing with an end shield at an end thereof and an oil cap secured to the end shield, comprising in combination: the end shield having a surface, the oil cap secured to the end shield, the end shield having circumferentially spaced protrusions extending out of the surface of the end shield and formed integrally therewith of the material of the end shield, the protrusions having edge means defining with the end shield surface a seat for the oil cap, the oil cap having an end surface that seats against the end shield surface and further having side surface means, the protrusions being deformed generally radially inwardly such that the edge means of the protrusions engage and overlie the side surface means of the oil cap to secure the oil cap to the end shield against both axial and rotational movement relative thereto, said protrusion positioned prior to deformation relative to the side surface means of the oil cap to allow ease of insertion of the oil cap within the close confines of the protrusions.

2. In the machine of claim 1, wherein the protrusions are formed by lancing.

3. In the machine of claim 1 wherein said protrusions extend in both axial directions, said oil cap being secured to the end shield at one side thereof, and an other oil cap being secured to the end shield at an other side thereof.

4. In the machine of claim 3 wherein the protrusions extending in one axial direction alternate with those extending in the other axial direction.

5. In the machine of claim 1 wherein the protrusions further comprise bars spaced from the end shield surface and connected at each end thereof.

6. In the machine of claim 1 wherein there are at least three said protrusions equally circumferential spaced.

7. In the machine of claim 1 wherein the side surface means of the end shield is circular and smooth, whereby the end shield is inserted within the seat in any circumferential orientation prior to deformation of the protrusions.

8. In a dynamoelectric machine having a housing with an end shield at an end thereof an oil cap secured to the end shield, comprising in combination: the end shield having a surface, the oil cap secured to the end shield, the end shield having circumferentially spaced protrusions extending out of the surface of the end shield and formed integrally therewith of the material of the end shields, the protrusions having edge means defining with the end shield surface a seat for the oil cap, the oil cap having an end surface that seats against the end shield surface and side surface means, said protrusions being deformed such that the edge means thereof engage and overlie the side surface means of the oil cap to secure the oil cap to the end shield against both axial and rotational movement relative thereto.

9. In the machine of claim 8 wherein the side surface means of the end shield is circular and smooth, whereby the end shield is inserted within the seat in any circumferential orientation prior to deformation of the protrusions.

10. In the machine of claim 9 wherein there are at least three said protrusions circumferentially equal spaced, and the protrusions further comprise bars spaced from the end shield surface and connected at each end thereof.

11. In the machine of claim 10 wherein said protrusions are formed by lancing.

* * * * *